US012574704B2

(12) United States Patent (10) Patent No.: US 12,574,704 B2
Ryan (45) Date of Patent: Mar. 10, 2026

(54) PROXIMITY MONITORING

(71) Applicant: MICROLISE LIMITED, Nottingham (GB)

(72) Inventor: Kirk R. Ryan, Nottingham (GB)

(73) Assignee: MICROLISE LIMITED, Nottingham (GB)

( * ) Notice: Subject to any disclaimer, the term of this patent is extended or adjusted under 35 U.S.C. 154(b) by 366 days.

(21) Appl. No.: 18/040,703

(22) PCT Filed: Aug. 2, 2021

(86) PCT No.: PCT/GB2021/051991
§ 371 (c)(1),
(2) Date: Feb. 6, 2023

(87) PCT Pub. No.: WO2022/029416
PCT Pub. Date: Feb. 10, 2022

(65) Prior Publication Data
US 2023/0292089 A1 Sep. 14, 2023

(30) Foreign Application Priority Data
Aug. 7, 2020 (GB) ...................................... 2012354

(51) Int. Cl.
*H04W 4/02* (2018.01)
*B60W 50/14* (2020.01)
*H04W 4/46* (2018.01)

(52) U.S. Cl.
CPC ............ *H04W 4/023* (2013.01); *B60W 50/14* (2013.01); *H04W 4/025* (2013.01); *H04W 4/46* (2018.02)

(58) Field of Classification Search
CPC ....... H04W 4/023; H04W 4/46; H04W 4/025; H04W 4/021; H04W 4/027; H04W 4/40;
(Continued)

(56) References Cited

U.S. PATENT DOCUMENTS

2017/0345228 A1 11/2017 Dibb et al.
2019/0014444 A1* 1/2019 Lei ........................ H04W 4/027
(Continued)

FOREIGN PATENT DOCUMENTS

CN 205256527 U 5/2016
DE 10 2018 008 046 A1 4/2019
(Continued)

OTHER PUBLICATIONS

Great Britain Search Report for Application No. GB2012354.3 dated Dec. 18, 2020; 1 pg.
(Continued)

*Primary Examiner* — Hirdepal Singh
(74) *Attorney, Agent, or Firm* — Day Pitney LLP; George Chaclas; Anthony A. Kassas

(57) ABSTRACT

A method of monitoring the proximity of two or more monitoring devices. The method includes defining a series of subspaces within the space containing the devices and determining the subspace containing the location of each device. The method also includes subscribing each device to one or more subspaces and publishing the presence of each device to other devices that are subscribed to the subspace containing the device's location. The series of subspaces are defined by a grid.

20 Claims, 7 Drawing Sheets

(58) Field of Classification Search
CPC ............. B60W 50/14; B60W 2556/45; B60W 2756/10; B60W 30/095; B60W 40/04; H04L 67/52; H04L 67/535; H04L 67/54; H04L 67/55; G08B 21/02; G08G 1/164; G08G 1/0112; G08G 1/0133; G08G 1/0141; G08G 1/005
USPC ...................................................... 455/456.3
See application file for complete search history.

(56) References Cited

U.S. PATENT DOCUMENTS

| | | | | |
|---|---|---|---|---|
| 2019/0297474 A1* | 9/2019 | Orsini | ................... | H04W 4/021 |
| 2020/0035103 A1* | 1/2020 | Siboni | .................... | H04L 69/16 |
| 2020/0100048 A1 | 3/2020 | Wu et al. | | |
| 2020/0260239 A1* | 8/2020 | Ahn | ..................... | G08G 1/0112 |
| 2020/0305064 A1* | 9/2020 | Silver | ................. | G08G 1/0965 |
| 2021/0215830 A1 | 7/2021 | Sahlin et al. | | |

FOREIGN PATENT DOCUMENTS

| | | |
|---|---|---|
| GB | 2562706 A1 | 11/2018 |
| IE | 20100011 A | 7/2011 |
| KR | 2020-0038229 A | 4/2020 |

OTHER PUBLICATIONS

Partial International Search Report for Application No. PCT/GB2021/051991 dated Nov. 5, 2021; 15 pgs.
International Search Report and Written Opinion for Application No. PCT/GB2021/051991 dated Jul. 1, 2022; 17 pgs.

\* cited by examiner

100
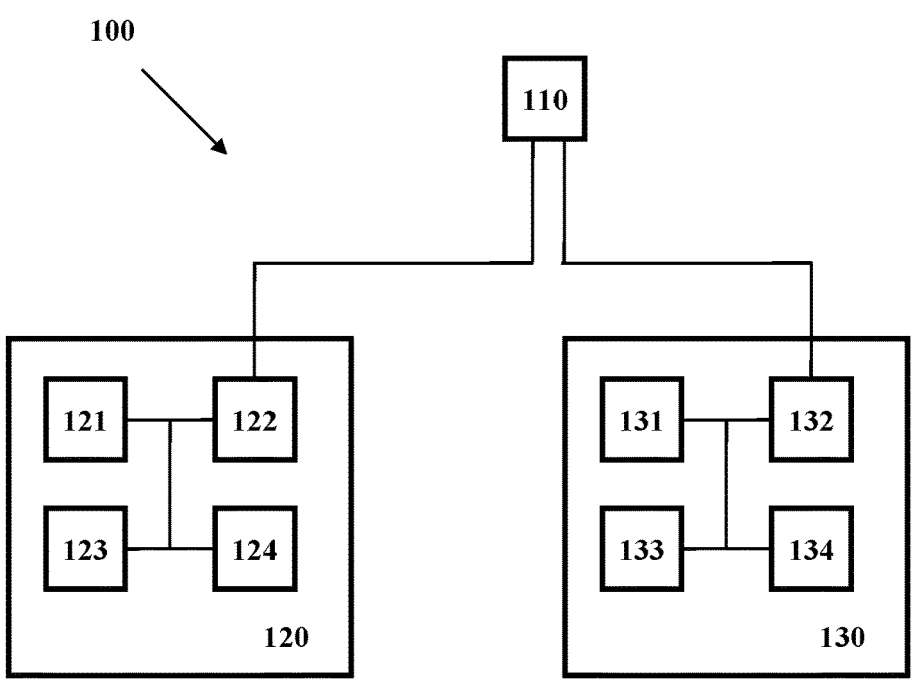
Figure 1
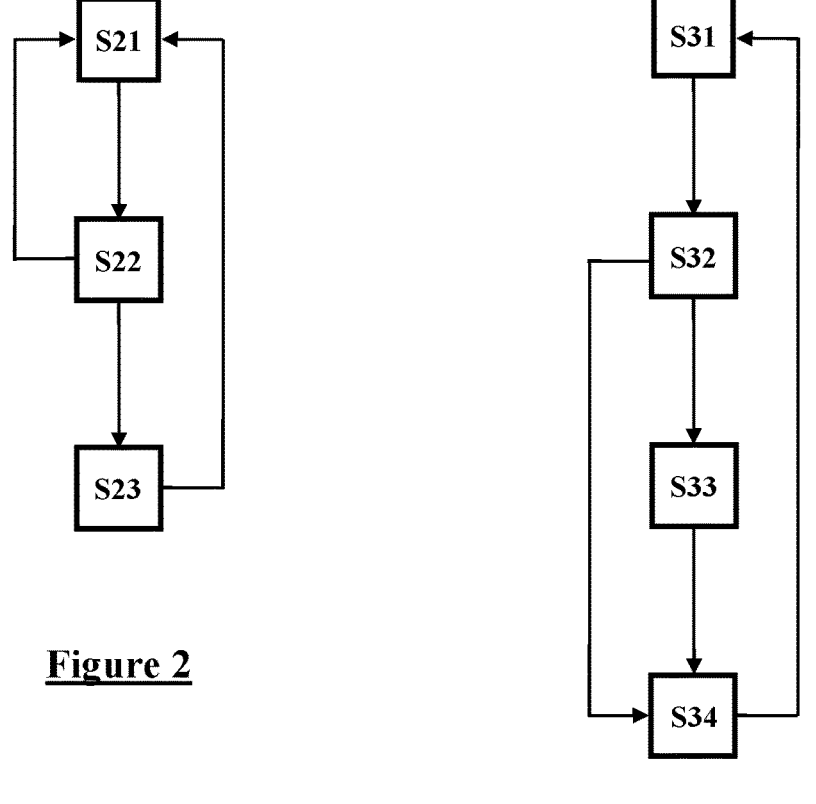
Figure 2
Figure 3

PROXIMITY MONITORING

CROSS-REFERENCE TO RELATED APPLICATIONS

The present application is a U.S. National Stage Application of International Application No. PCT/GB2021/051991, filed Aug. 2, 2021 and published on Feb. 10, 2022 as WO2022/029416 A1, which claims benefit and priority of Great Britain Patent Application No. GB2012354.3, filed on Aug. 7, 2020, each of which is incorporated herein by reference in its entirety for any purpose whatsoever.

FIELD OF THE DISCLOSURE

The present disclosure relates to proximity monitoring, in particular to the dynamic monitoring of the proximity of multiple objects each provided with a proximity monitoring device, and most particularly to applications of proximity monitoring to generate proximity notifications.

BACKGROUND

Proximity monitoring is useful in dynamic systems as it can be used to both record the behaviour of objects in the system, as well as provide real-time notifications based on the proximity of different objects. These systems typically operate by providing each object with a monitoring device that reports its location to a central processor or computer that performs the monitoring. One application of this kind of monitoring is to generate proximity notifications when two objects are within a pre-defined distance of one another.

These notifications are very useful as they can be used to enhance safety in a wide range of real world scenarios. For example, a driver of an automobile can be notified in advance of approaching a vulnerable road user (VRU), such as a cyclist or slow moving vehicle. This can allow the driver to prepare for the VRU earlier and can reduce the risk of a collision. These notifications can also be useful in many other scenarios, such as outdoor activities like mountain biking and skiing.

Existing systems for generating proximity notifications work by calculating the distance between a given object and all other objects, and then generating notifications based on the calculated distances. While this works for systems comprising a relatively small number of objects, this approach generates a significant computational demand when scaled to systems comprising many objects, such as a road network.

The computational demand of existing systems means that notifications cannot be generated locally on a personal computing device such as a mobile phone. Furthermore, even when performed on more powerful computing devices, the computational demand can also result in a significant delay in reporting. This reduces the performance of the monitoring system.

It is therefore an object of embodiments of the present disclosure to at least partially overcome the above issues.

SUMMARY

According to a first aspect of the present disclosure there is provided a method of monitoring the proximity of two or more monitoring devices comprising the steps of: defining a series of subspaces within the space containing the devices; determining the subspace containing the location of each device: subscribing each device to one or more subspaces;

and publishing the presence of each device to other devices that are subscribed to the subspace containing the device's location wherein the series of subspaces are defined by a grid.

According to a second aspect of the present disclosure there is provided a system for proximity monitoring, the system comprising two or more monitoring devices and a device manager in communication with each monitoring device, each monitoring device comprising: a location module configured to define a series of subspaces in the space containing the monitoring devices and determine the subspace containing the device's location; and a communication module configured to transmit details of the subspace containing the device's location to the device manager and to receive information from the device manager, wherein the device manager is arranged to: receive information from each device: store a subscription of each device to one or more subspaces; and publish the presence of each device to other devices that are subscribed to the subspace containing the device's location wherein the series of subspaces are defined by a grid.

Thus, devices are notified when another device is located in a relevant subspace. This enables the proximity of devices to be determined without the need for the distance between each device to be calculated. Preferably the presence of a device is published to all other devices that are subscribed to the subspace containing a particular device. As each device selectively receives publications on the basis of the subspaces that it subscribes to, proximity monitoring can be performed with lower computational requirements on the system resulting in quicker and more effective operation. The present disclosure is therefore scalable to situations containing large numbers of devices that would overwhelm existing systems.

Furthermore, by defining subspaces in terms of a grid, the present disclosure is effective irrespective of the environment the devices are in. This ensures the method is not reliant on updates to externally controlled/provided information such as maps or road layouts to work correctly.

The location module may be configured to determine one or more subspaces the device subscribes to. The communication module may be configured to transmit details of the subscribed subspaces to the device manager. The device manager may be configured to update the stored subscription of a device to subspaces in response to received information from the device. As such, each device can choose which subspaces a device should subscribe to ensure appropriate proximity monitoring.

The device manager may be configured to define a series of subspaces in the space containing the monitoring devices. The device manager may be configured to transmit the definition of the series of subspaces to each device. The communication module may be configured to receive a definition of a series of subspaces from the device manager. The location module may be configured to determine the device's location. The communication module may be configured to transmit the device's location to the device manager. The device manager may be configured to determine the subspace containing a device. The device manager may be configured to determine one or more subspaces the device subscribes to. As such, the device manager can optionally control any of the definition of subspaces, allocation of devices to subspaces, and subscription of devices to subspaces.

A device may be subscribed to the subspace containing its location, and could be subscribed only to that subspace. A device may be subscribed to all subspaces adjacent to the subspace containing its location and optionally also the subspace containing its location. The device may be subscribed only to these subspaces. A device may be subscribed, and optionally only, to all subspaces within a certain distance of the device. A device may be subscribed to all subspaces within a certain distance of the device when it is close to the poles of the Earth. For example, when a device is within 20 degrees, 15 degrees, or 10 degrees latitude of either pole. A device may be subscribed to, and optionally only subscribed to, subspaces defined by a subscription area. The subscription area may be different for each device. The shape and/or size of the subscription area may depend on any one or more of the device's: location; speed; heading; class; planned/predicted route; visibility; local weather conditions; seniority/priority status; or, services it provides. The device class may define a type or class of vehicle or user the device is associated with. The subscription area may be symmetric or asymmetric. The subscription area may extend further in a direction parallel to the device's heading than in other directions. The subscription area may extend along the planned or predicted route of a device. The subscription area may extend over all locations accessible to a device within a predefined time. Thus, the present disclosure can adjust the subspaces a device is subscribed to in order to ensure the device receives appropriate publications.

The method may include the step of determining if the device has moved into a different subspace. The method may include the step of changing the subspace(s) a device is subscribed to in response to movement of the device into the different subspace. The method may include the step of publishing the presence of the device to devices subscribed to the different subspace. The location module may be configured to detect when the device has moved into a different subspace. The communication module may be configured to transmit details of the subspace containing the device in response to movement of the device into the different subspace. Thus, devices subscribed to the new subspace are made aware of the movement of a device into the subspace.

The method may include the step of determining when a device has moved a threshold distance. The method may include publishing the presence of a device in a subspace in response to movement of the device. The location module may be configured to determine when the device has moved a threshold distance. The communication module may be configured to transmit details of the subspace containing the device in response to movement of the device. The threshold distance may depend on the speed of the device. The threshold distance may increase as the speed of the device increases. Preferably, the threshold distance is 10 metres. The movement of a device a threshold distance may be replaced with any other suitable criteria. The criteria may be time and/or distance based. The criteria may be related to the device specific information of the device, such as the speed: class: location: heading: or priority status of the device. Thus, the present disclosure allows for devices to repeatedly publish to a subspace while they are within it, this ensures that the proximity of devices is continually monitored and suitable notifications are generated.

The subspaces may be any suitable size or shape. All subspaces may be the same fixed size. The grid may be a (2D) lattice. The grid may be a substantially uniform grid. The grid may be defined by a repeating unit or block. The unit may be a square, or in some embodiments any suitable shape that can be repeated to form a grid such as a rectangle, triangle, or hexagon. Each repeated unit in the grid may correspond to one subspace. The shape/size of each subspace may be independent of any one or more of: the subspace's location: roads, paths or routes through the subspace; and, external data relating to the subspace's location. External data relation to the subspace may include any one or more of: mapping data; weather data; Where the subspaces are defined by a grid, each device may be subscribed to a 3×3 array of subspaces centred on the subspace containing its location. The subspaces may be defined by a longitude and/or a latitude. A preferred size of each subspace may be 0.001 degrees in latitude and/or longitude, or 100 metres in size. Thus, the grid's properties further ensure the present disclosure is effective irrespective of the environment the devices are in. The properties of the grid outlined above are not reliant on updates to externally controlled/provided information such as maps or road layouts and as such the present disclosure is not vulnerable to errors/inefficiencies caused by inaccurate externally provided information.

Where subspaces are defined by a longitude/latitude, the longitudinal size of each subspace may vary to ensure all subspaces have an approximately uniform size as measured in absolute units, such as square metres. The subspaces may be defined by a longitude/latitude and/or an absolute distance, such as metres. In such embodiments, subspaces close to the poles of the Earth may be defined in terms of an absolute distance. A subspace may be determined as close to the poles if it is at latitudes within 20 degrees, 15 degrees, or 10 degrees of either pole. Subspaces far from either pole may be defined in terms of a longitude and/or a latitude (and not an absolute distance). A subspace may be determined as far from either pole if it is at latitudes at least 10 degree, 15 degrees, or 20 degrees from either pole. Thus, the absolute size of subspaces close to the poles are not affected by changes to the absolute size of longitudinal distances close to the poles and such subspaces have an approximately uniform absolute size. This prevents errors in proximity monitoring that may be caused by having subspaces of different absolute sizes while allowing use of the longitude/latitude system for defining subspaces.

The step of determining the subspace containing the device may involve rounding the device's longitude and/or latitude to the nearest 0.001 degrees. The location module may perform this functionality. The present disclosure thereby allows for the convenient and quick allocation of devices to a subspace using a device's longitude/latitude.

The method may include the step of generating a proximity notification. Each monitoring device may further comprise a proximity module configured to generate proximity notifications. Proximity notifications may be generated in response to receipt of a publication by the device. A proximity notification may be generated on the basis of a received publication and any one or more of each device's: location: speed: heading: class: planned/predicted route; visibility: local weather conditions: seniority/priority status: or, services it provides. The present disclosure thereby provides for each device to generate proximity notifications locally and on the basis of a wide range of information.

The method may include the step of determining the location of a device. The method may include publishing the location of a device to devices that are subscribed to the subspace containing the device's location. The method may include calculating the distance between a device receiving a publication and the device referred to in the publication. The method may include generating a proximity notification if the calculated distance is less than a threshold distance. The location module may be configured to determine the location of the device. The communication module may be configured to transmit details of the device's location to the device manager. The device manager may be configured to include details of a device's location in publications to other devices. The proximity module may be configured to generate a proximity notification if the distance between the device and the device referred to in the received publication is less than a threshold distance. The threshold distance may be 100 metres or less.

The method may include recording proximity notifications. The method may include storing an alerted counter and incrementing the alerted counter in response to a proximity notification. The method may include the step of maintaining one or more alerted counters. The proximity module may be configured to: store an alerted counter; and, increment the counter in response to a proximity notification. The proximity module may maintain one or more alerted counters. Each alerted counter may relate to any one or more of; a specific device; group of devices; a location; a time-period; or a class of device. Thus, the present disclosure can record information about proximity notifications generated. This can allow for increased awareness of notifications generated in relation to a variety of environmental factors such as particular roads, times of day, or types of vehicle. It can also increase user participation in the system where they are aware of the number of alerts generated around them.

The method may include considering the record of notifications when generating a proximity notification. The proximity module may be further configured to consider the record of notifications when generating a proximity notification. Proximity notifications may be generated if the record of notifications indicates that no similar notification has been sent to the device recently. Recently may be defined in terms of time and/or distance. A proximity notification may be generated if the record indicates a threshold time has passed since a previous proximity notification. The threshold time may be 30 seconds. Two notifications may be defined as similar if they relate to the same devices. The record of proximity notifications may comprise proximity notifications received and/or generated by the device. Thus, proximity notifications are generated in a more efficient manner. This reduces the number of notifications a device receives whilst making the notifications that are received more meaningful. This increases the performance of the system as notifications are less likely to be ignored.

The method may include the step of: storing device specific information relating to each device. The method may include the step of including device specific information in publications transmitted to each device. The communication module may be configured to store device specific information relating to the device and include device specific information in transmissions made by the device. The device specific information may include any one or more of a device's: unique identifier: location: speed: heading: class: planned or predicted route; and, priority status, wherein the unique identifier allows each device to be identified. The method may include calculating device specific information for each device and/or communicating device specific information to each device. The device manager may be configured to include device specific in publications made to devices. The location module may be configured to calculate device specific information relating to a device. Thus, the present disclosure provides for each device to receive relevant information relating to other devices.

The method may include the step of transmitting information relating to a proximity notification to a device in the form of a publication. The communication module may be configured to transmit information relating to a proximity notification to the device manager. The device manager may be configured to transmit information relating to a proximity notification to a device in the form of a publication. The information relating to a proximity notification may include the unique identifier of the devices to which the proximity notification relates. Proximity notifications may be transmitted to a device where the device's unique identifier matches a unique identifier included with the proximity notification. Thus, the present disclosure provides for devices to efficiently transmit proximity notifications to each other so they can take appropriate action.

The method may include the steps of: generating a request for assistance in relation to a device; and, publishing the request for assistance to other devices that are subscribed to the subspace containing the device's location. Each monitoring device may further comprise a user interface configured to generate an assistance request. The communication module may be configured to transmit details of an assistance request to the device manager. The device manager may be configured to transmit the assistance request as a publication to other devices subscribed to the subspace containing the device. Thus, the present disclosure allows for devices to request assistance from nearby devices.

An assistance request may be generated in response to any one or more of; a detected fault in the device; a detected fault in a vehicle associated with the device; a detected incident involving the device; and a received input from a user of the device. The method may include the step of detecting a fault or incident involving the device. The method may include the step of receiving an input from a user of the device. The location module may be configured to detect a fault or incident involving the device. The user interface may be configured to generate an assistance request in response to an input from a user of the device or a detected fault/incident involving the device. Thus, assistance requests can be generated either automatically or manually.

The method may include storing an assistance subscription of one or more devices to one or more subspaces for the purpose of receiving assistance requests. The device manager may be configured to: store an assistance subscription of one or more devices to one or more subspaces for the purpose of receiving assistance requests; and publish assistance requests made by a device in a subspace to other devices subscribed to that subspace for the purpose of receiving assistance requests. The location module may be configured to subscribe the device to one or more subspaces for the purpose of receiving assistance requests. The communication module may be configured to receive publications containing an assistance request in subspaces defined by the assistance subscription via the device manager. The assistance subscription of a device may be different to the subscription of the device for the purpose of receiving publications relating to the presence of other devices. The assistance subscription may relate to a larger number of subspaces than the subscription of the device for the purpose of receiving publications relating to the presence of other devices. Thus, the disclosure allows for devices to selectively subscribe to subspaces for the purpose of receiving assistance requests.

The assistance subscription of a device may be defined by an assistance area. The assistance area may have any one or more features of the subscription area described above. The assistance area may be the same as the subscription area. The assistance area may be different from the subscription area. Preferably, the assistance area is larger than the subscription area. The assistance area may extend along the predicted or planned route of the device. The assistance area may extend over all locations between a device and the device's destination. The assistance area may be defined in terms of locations accessible to the device within a predefined time. This allows devices to optimise both the subscription area for the purpose of proximity notifications and the assistance area for the purpose of assistance requests.

The class of a device may include an assistance provider. The assistance area used by an assistance provider may be larger than assistance areas used by devices of other classes. Thus, assistance providers are provided with relevant assistance requests and can provide assistance accordingly.

The method may include the step of notifying a user of a device in response to receipt of a publication by the device. Each monitoring device may additionally comprise a user interface configured to notify a user of the monitoring device in response to a received publication. The present disclosure thereby provides for users of the devices to be suitably notified of received publications. This can allow the user to take appropriate action in relation to other nearby other devices, proximity notifications, and assistance requests.

The method may include the step of recording the notification of a user to a proximity notification. The proximity module may be configured to record the notification of a user to in relation to a proximity notification. Thus, when a user is notified of a proximity notification, this can be recorded and transmitted to other devices as information relating to a proximity notification as described above. This allows other devices to confirm that they have received and acted on a proximity notification.

The method may include establishing two-way communication between two or more devices. The communication module may be further configured to establish two-way communication with another device. The communication module may be configured to establish two-way communication in response to a received input by the user to the user interface. Two-way communication may be established in response to a received publication. Preferably, two-way communication may be established in response to a received publication relating to an assistance request. Thus, the present disclosure provides for assistance to be provided/arranged remotely.

The monitoring device may be provided on any suitable object. The object may be static or moveable. The object may be a mobile device. The monitoring device may be integrated into any one or more of; a smart phone; a tablet; a laptop; or the like. The monitoring device may be integrated into a vehicle. The vehicle may be any suitable vehicle such as: an automobile; a bicycle; a motorbike; a scooter; a bus; a lorry; a train; a boat; or an aeroplane. The vehicle may be an autonomous vehicle. The monitoring device may be a dedicated device. The monitoring device may be a dedicated navigational device. Thus, the present disclosure can be used to monitor the proximity of objects/devices in many different scenarios.

The class of a device may comprise a vulnerable road user (VRU). A VRU may be any one of; a pedestrian: cyclist: motorcyclist: learner driver: new driver; disabled driver; slow-moving vehicle: wide-load; an animal or animals. A device associated with a VRU may have a specific class or priority status. Thus, the present disclosure can generate notifications to ensure VRUs are appropriately flagged to other users.

Where the class of a device is a VRU, the method may include the step of determining when a VRU class device has moved a threshold distance and publishing the presence of the VRU class device in a subspace in response to movement of the VRU class device over at least the threshold distance. Preferably, the threshold distance is 10 m. The threshold distance may be combined with a threshold time, and publication may occur when either: the VRU class device moves at least the threshold distance; and/or the threshold time elapses since the last publication. The step of publishing the presence of a VRU class device in a subspace may be independent of movement of the VRU class device between different subspaces. The threshold distance may be less than the size of a subspace, in a preferred embodiment it is one tenth the length/width of a subspace. Thus, the location of VRU class devices, which may be slower moving, is published frequently and independently of the subspace in which the VRU class device is located.

Where the class of a device is not a VRU, the method may include the step of determining if a non-VRU device has moved into a different subspace, and publishing the presence of the non-VRU device to devices subscribed to the different subspace. Thus, devices subscribed to the new subspace can take appropriate action in view of the movement of the non-VRU class device into the subspace.

The system may comprise at least: 10; 100; 1,000; 10,000; 100,000; or, 1,000,000 monitoring devices. As the system is scalable it can provide efficient and effective proximity monitoring for many devices.

Any of the location module, communications module, proximity module, and user interface may comprise; a power source; a computer processor; and/or a rewriteable memory. The processor may allow each component to perform their functions as required. The memory may allow them to store information as required. The memory may be any suitable type of computer memory such as a hard disk drive, solid state drive, flash memory, or the like. The power source, processor and/or memory may be shared among the components of the device.

The location module may comprise one or more motion sensors. The motion sensor(s) may be any of; a global positioning system; an accelerometer; a speedometer; a gyroscope; or a compass.

The communication module may comprise a communicator. The communicator may communicate with the device manager by one or more suitable wireless platform(s). The platform(s) may be any of: wireless mobile internet (such as 4G®; 5G®; etc); radio: WiFi®, Bluetooth®, or similar.

The user interface may comprise any one or more of; a display; a touch screen display; a speaker; a button; or the like.

According to a third aspect of the present disclosure there is provided a monitoring device suitable for use in communication with a device manager for proximity monitoring, the mobile device comprising: a location module configured to define a series of subspaces in the space containing the devices, and determine the subspace containing the device's location; and, a communication module configured to transmit details of the subspace containing the device's location to the device manager and to receive information from the device manager wherein the series of subspaces are defined by a grid.

According to a fourth aspect of the present disclosure there is provided a device manager for proximity monitoring suitable for use in communication with two or more monitoring devices, the device manager arranged to receive information from each device; store a subscription of each device to one or more subspaces; and publish the presence of each device to other devices that are subscribed to the subspace containing its location wherein the series of subspaces are defined by a grid.

The device manager may comprise any one or more of; a processor; a rewritable memory; a user interface; and, a power source.

The device manager may be a remote server; or cloud server.

The device manager may be integrated into one of the monitoring devices.

The device/device manager of the third/fourth aspect of the present disclosure may include any or all features of the first two aspects of the present disclosure as desired or as appropriate.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

DETAILED DESCRIPTION

In order that the disclosure may be more clearly understood one or more embodiments thereof will now be described, by way of example only, with reference to the accompanying drawings, of which:

FIG. 1 is a schematic diagram of a system for proximity monitoring of a driver monitoring device and a cyclist monitoring device;

FIG. 2 is a flow diagram for a process the driver monitoring device of FIG. 1 follows;

Figure 4:
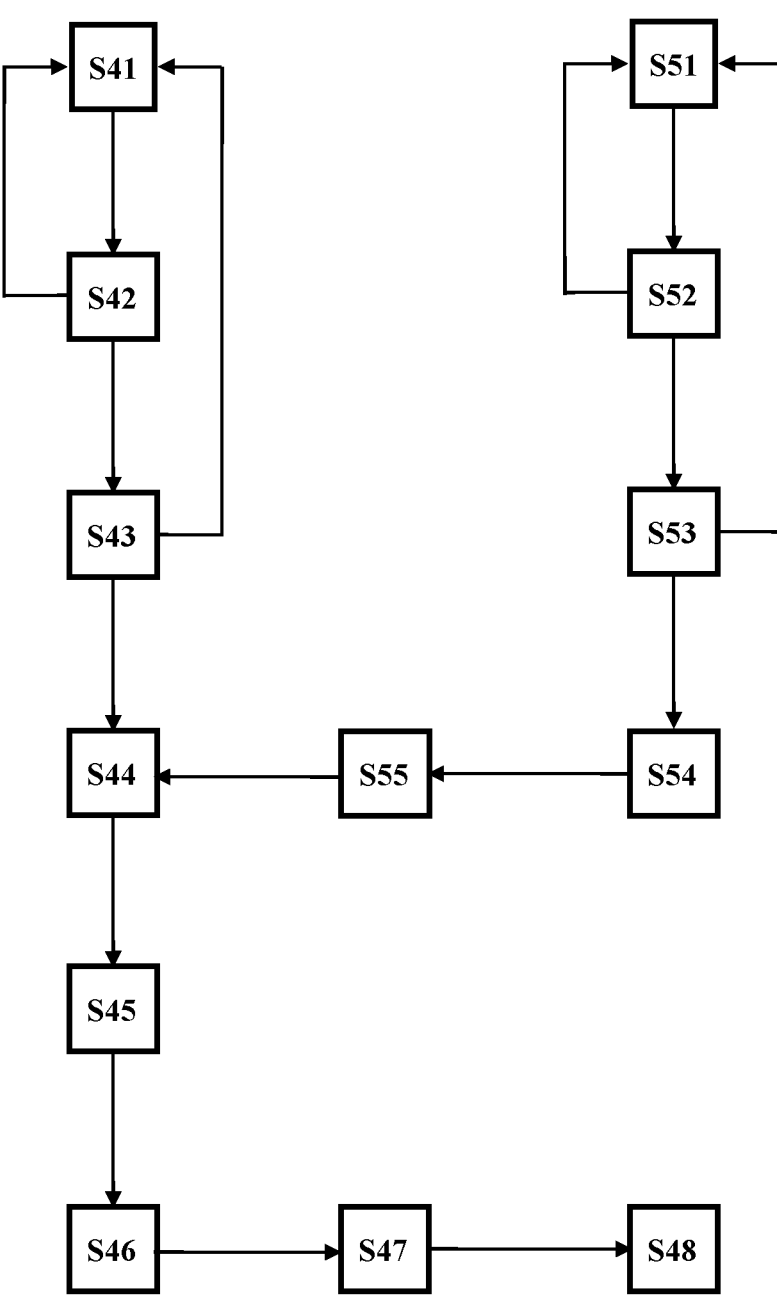
Figure 6A:
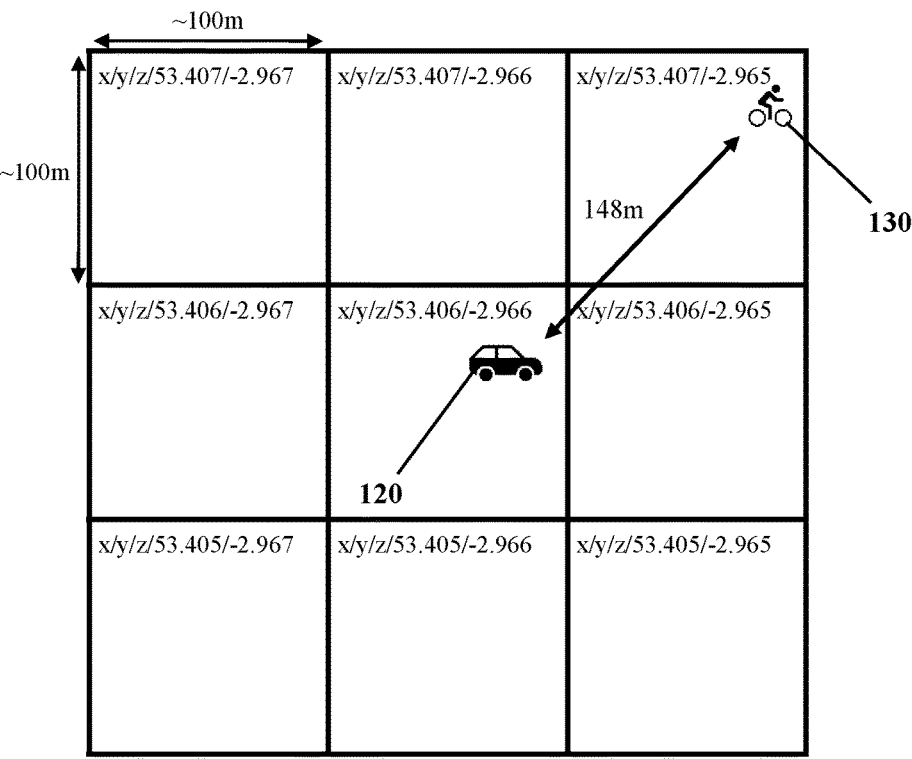
Figure 6B:
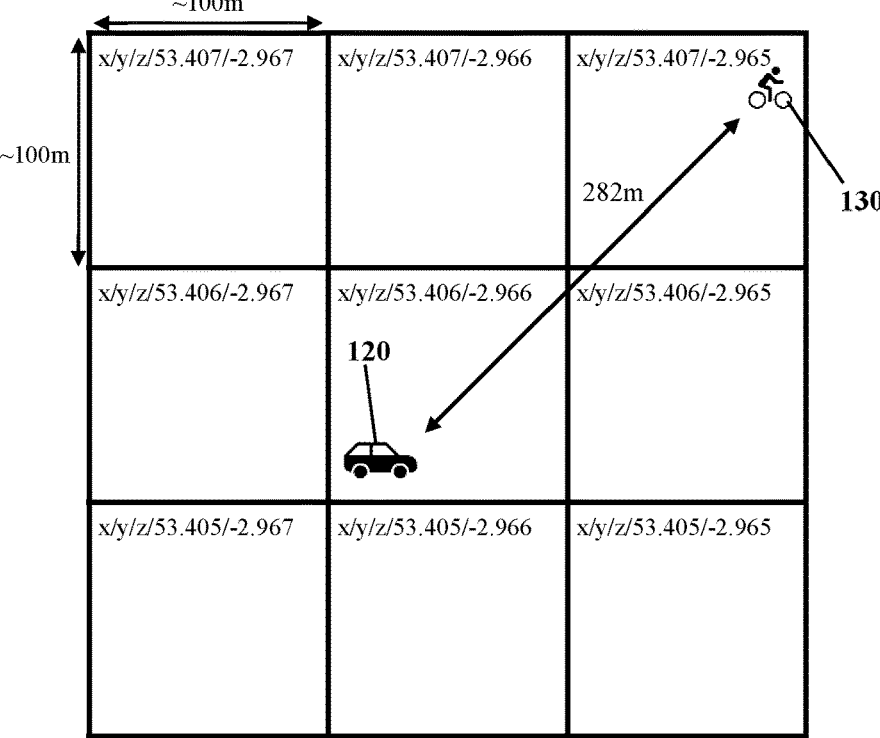
Figure 7:
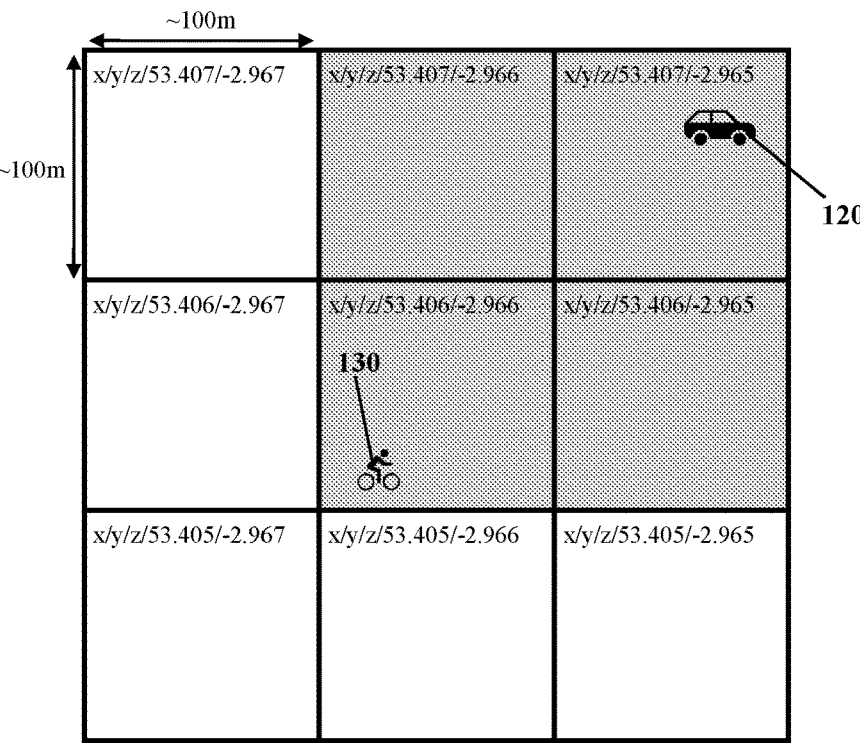
Figure 8:
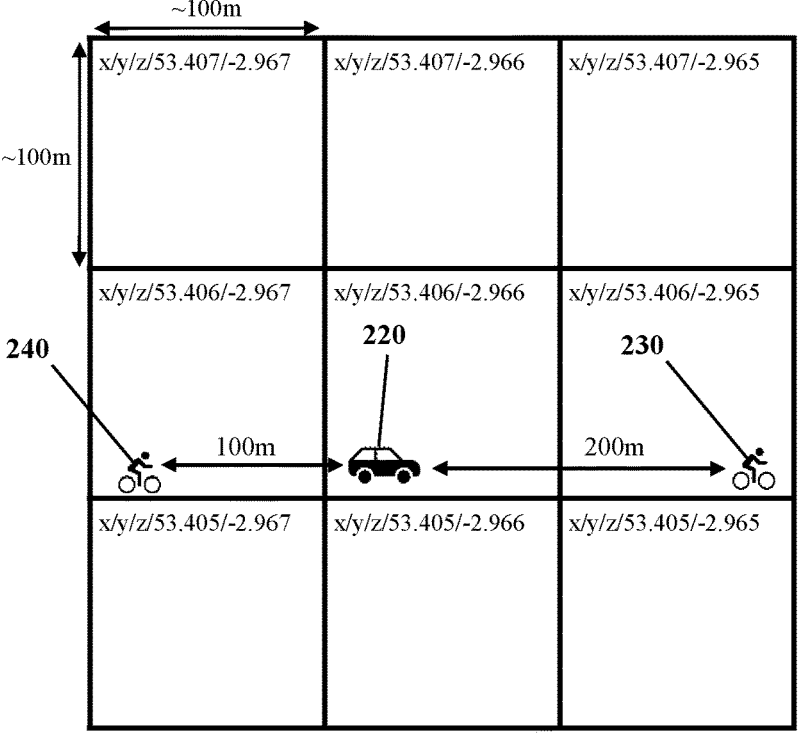
Figure 9:
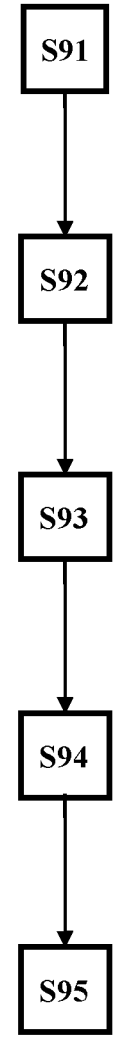

FIG. 3 corresponds to FIG. 2 but for the cyclist monitoring device;

FIG. 4 is a flow diagram for the process of generating a proximity notification in the system of FIG. 1;

FIG. 5a-g are example schematic diagrams of the movement of the driver monitoring device of FIG. 1 when in use;

FIG. 6a-b are schematic diagrams of relative example positions of the devices of FIG. 1 when in use;

FIG. 7 is a schematic diagram of other relative example positions of the devices of FIG. 1 when in use;

FIG. 8 is a schematic diagram of relative example positions of three devices in a second system for proximity monitoring; and, FIG. 9 is a flow diagram for assistance requesting functionality of the system of FIG. 8.

DETAILED DESCRIPTION

The subject technology overcomes many of the prior art problems associated with proximity monitoring. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

Referring to FIG. 1, a system for proximity monitoring 100 is shown according to a first embodiment of the present disclosure. The system 100 comprises a device manager 110 in communication with a driver monitoring device 120, and a cyclist monitoring device 130. Each monitoring device 120, 130 comprises a location module 121, 131, a communication module 122, 132, a proximity module 123, 133, and a user interface 124, 134, all in communication with each other. Each device 120, 130 and the device manager 110 also comprise an electric power source (not shown).

The device manager is typically implemented by a server or other computer device connected to a communication network, typically the internet or a telecoms network. Each monitoring device is able to communicate wirelessly with the network and hence the device manager.

The location module may comprise one or more motion sensors such as a global positioning system; an accelerometer; a speedometer; a gyroscope; or a compass. The communication module may communicate with the device manager by one or more suitable wireless platform such as: radio; telecoms networks, WiFi R, Bluetooth®, or similar. The user interface may comprise any one or more of; a display; a touch screen display; a speaker; a button; or the like.

It is envisaged that the number of monitoring devices can be increased as desired, and that in a working arrangement there may be at least 100, 1,000 or 10,000 devices all communicating via the device manager.

In this embodiment a series of blocks define subspaces within the space containing the devices 120, 130. The blocks are defined by a substantially uniform square grid wherein each block is a grid square approximately 100 metres in width. Each block is uniquely identified.

In use, the location module 121, 131 of each monitoring device is configured to determine the location of the device 120, 130, and identify the block containing that location, and thus the monitoring device. In addition, the location module 121, 131 is configured to define one or more blocks that each device 120, 130 subscribes to. In this embodiment, each device 120, 130 is subscribed to a 3×3 block square array of adjacent blocks, centred on the block containing its location. Subscribing involves the device communicating with the device manager to notify the device manager of blocks of interest and the device manager stores the identity of those blocks in association with the identity of the subscribing device. However, in alternative embodiments the device may transmit its location to the device manager and the device manager may identify the block containing the device and subscribe the device to one or more blocks as appropriate.

In this embodiment, both the driver and cyclist devices subscribe to a 3×3 array of blocks centred on the device's current location, but in other embodiments they may subscribe to different sized areas. For example, the cyclist may subscribe to a 3×3 array, and the driver may subscribe to a 5×5 array.

In other embodiments, subspaces may be defined by a longitude and latitude, for example 0.001 degrees. In these embodiments, the subspaces a device subscribes to may be dynamically adjusted to account for changes in the absolute size of a subspace at extreme latitudes. For example, each device may subscribe to all subspaces within a given distance of the device, such as 100 metres or 150 metres. This becomes increasingly important close to the poles of the Earth, for example within 15 degrees latitude of either pole and prevents errors in proximity monitoring that may be caused by having subspaces of different sizes.

The communication module 122, 132 is configured to cause publications to be made on behalf of the device 120, 130, and receive publications caused by other devices 120, 130 by transmitting information to and receiving information from the device manager 110. The communication module is also configured to store device specific information, such as the device's unique identifier, such as a unique number, that allows the device to be identified, and the device's class (e.g. cyclist or driver).

The proximity module 123, 133 is configured to generate proximity notifications in response to a received publication and record details of proximity notifications.

The user interface 124, 134 is configured to notify a user of the device 120, 130 to a proximity notification, and the proximity module 123, 133 is further configured to record details of proximity notifications notified to the user of the device 120, 130.

In this embodiment, the cyclist monitoring device 120 is a smart phone which is in use carried by a cyclist (not shown), and the driver monitoring device 130 is a navigation system integrated into an automobile (not shown). However, in other embodiments, a wide range of monitoring devices are possible, for example a driver monitoring device could also be implemented by a smart phone. In addition, other embodiments are possible with many more additional monitoring devices representing individual users.

Referring to FIGS. 2-4, proximity monitoring using the driver device 120 and cyclist device 130 is described in more detail.

With reference to FIG. 2, the operation of the driver device 120 as it moves in space is described. At step S21, the location module 121 detects when the device 120 has moved at least 10 metres, if it has, the process moves to step S22.

At step S22, the location module 121 determines if the device 120 has moved into a different block. If the device 120 has not moved into a different block, the process moves back to step S21. If the device 120 has moved into a different block, the process moves to step S23.

At S23, the location module 121 subscribes the device 120 to a 3×3 array of blocks centred on the block containing the device's location by transmitting information to the device manager. At this point the device manager will automatically unsubscribe the device from any blocks to which it was previously subscribed which are not contained in the current 3×3 array. In addition, the communication module transmits the identity of the block containing the device's location together with information relating to the class of device, the location of the device and a unique identifier for the device to the device manager 110 for publication to other devices. Once step S23 is complete, the process then loops back to step S21.

With reference to FIG. 3, a similar process to FIG. 2 is described for the cyclist device 130. At step S31, the location module 131 detects when the device 130 has moved at least 10 metres.

At step S32, the location module determines if the device 130 has moved into a different block. If the device 130 has not moved into a different block the process moves straight to step S34, but if it has moved to a different block, the process moves to step S33.

At step S33, the location module 131 subscribes the device 120 to a 3×3 array of blocks centred on the block containing the device's location by transmitting information to the device manager, which automatically unsubscribes the device from any blocks to which it was previously subscribed which are not contained in the 3×3 array.

At step S34, the communication module transmits the identity of the block containing the device's location together with information relating to the class of device, the location of the device as determined by the location module, and a unique identifier for the device 130 to the device manager for publication to other devices. The process then loops back to step S31.

As described above, the driver device 120 transmits its location to the device manager whenever it moves 10 meters and into a new block, whereas the cyclist publishes its location every time it moves 10 metres. As such, the location of the cyclist, who is vulnerable road user (VRU) and likely to be slower moving, may be more frequently published to ensure accurate proximity monitoring. This contrasts with the driver device 120 which is not a VRU, and therefore does not require such frequent location reporting.

Following step S23 or S34, the device manager 110 receives information from a device 120, 130. The device manager inspects the received information to determine the block containing the device which sent the information. The device manager then looks up all other devices that are subscribed to that block, and transmits the received information as a publication to those devices.

With reference to FIG. 4, the generation of a proximity notification in response to the receipt of publications by the devices 120, 130 is described.

As mentioned above, devices will receive publications from the device manager whenever another device which identifies itself as located in a block to which the devices are subscribed makes a transmission to the device manager. In this example, at step S41, the communication module 121 of the driver device 120 receives a publication which issued in response to information being sent by the cyclist device 130 to the device manager 110. The process then moves to step S42.

At S42, the proximity module 123 applies criteria to determine if a proximity notification should be generated. In this embodiment, the received publication includes the location of the cyclist device 130 as determined by the location module of the device 130. This is able to determine the location to a greater precision than the size of a block. The proximity module 123 uses this location, together with the location of the driver device 120 provided by location module 121 to determine the distance between the driver device 120 and the cyclist device 130. If the distance meets predefined distance criteria, the process moves to step S43. If not, the publication is ignored and the process starts again at S41 when a further publication is received. In this example, the predefined distance criteria are 100 metres or less.

At S43, the proximity module 123 determines if the driver has recently been notified of the cyclist device 130. In this example, recently is defined in terms of time and is within the last 30 seconds. The proximity module 123 searches for proximity notifications that relate to the cyclist device 130, and if it finds one that occurred within the last 30 seconds, the publication is ignored and the process returns to S41. If not, the process moves to step S44 and the proximity module 123 generates a proximity notification which is notified to the driver via the user interface.

At step S45 the proximity module 123 records the notification of the driver to the presence of the cyclist by incrementing an alert counter.

At step S46 the communication module 122 transmits a notification to the cyclist device by transmitting the information to the device manager along with the unique ID number of the cyclist device (received with the published position notification received from the device). The device manager then forwards the notification as a publication to the cyclist with reference to its unique ID number to inform the cyclist that the driver has been alerted.

At step S47, the communication module 132 of the cyclist device 130 receives the publication containing the notification.

At step S48, the proximity module 134 of the cyclist device 130 records the notification of the driver in response to the received publication. As with the driver device 120, the proximity module 133 of the cyclist device 130 increments an alert counter in response to notification of a driver to the presence of the cyclist.

This is the end of the process, and the communication module 122, 132 of both devices returns to awaiting receipt of publications.

Referring again to FIG. 4, the cyclist device 130 also generates proximity notifications.

At step S51, the communication module 131 of the cyclist device 130 receives a publication from the device manager relating to a block it is subscribed to and the process moves to S52. In this example the device manager made the publication in response to information sent by the driver device 130.

At S52, the proximity module 133 applies criteria to determine if a proximity notification should be generated. As with step S42, the proximity module 133 determines the distance between the cyclist device 130 and the driver device 120. If the distance meets predefined distance criteria, the process moves to step S53. If not, the publication is ignored and the process starts again at S51. The predefined distance criteria are 100 metres or less.

At S53, the proximity module 133 determines if the driver has recently been notified of the cyclist device 130. As above, recently in this context means in the last 30 seconds. If so, the publication is ignored and the process returns to S51, if not, the process moves to step S54.

At step S54, the proximity module generates a proximity notification and the communication module 132 transmits the proximity notification to the driver device 120 by transmitting it to the device manager 110 along with the driver device's unique ID number. The device manager 110 then forwards the proximity notification as a publication to the driver with reference to its unique identifier.

At step S55 the communication module 122 of the driver device 120 receives the publication including the proximity notification from the device manager. The process then continues from step S44 as described above.

Therefore, by following the processes described in FIGS. 2-4, the devices 120, 130 notify each other of their location and can generate timely proximity notifications to ensure the driver is notified of the cyclist.

In this embodiment, the system is configured such that only the driver is notified of proximity notifications. However, many other embodiments are possible where devices notify users on the basis of many different criteria. For example, cyclists may be notified of another cyclist approaching from behind, or two skiers may be notified of each other when approaching each other on a mountain.

FIGS. 5a-g show how the blocks that the driver monitoring device 120 subscribes to change as the device moves through a grid defined in space, and when the device issues a transmission relating to its location. In this example the grid is a 5×5 square grid defined by rows A-E and columns 1-5.

Figure 5A:
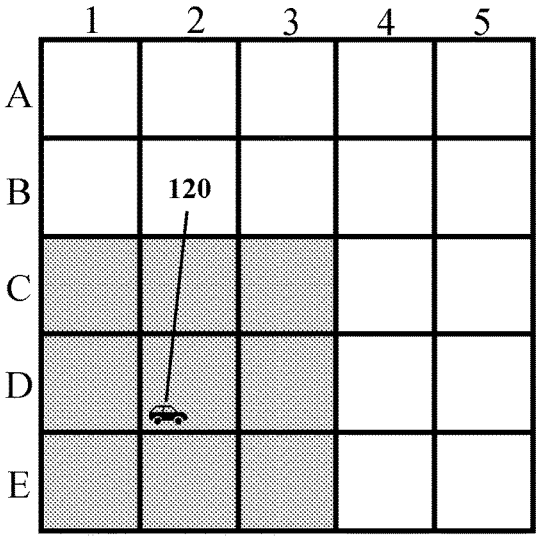

In FIG. 5a, the device 120 begins adjacent to block D1 and in block D2, and as described above the device 120 subscribes to the 3×3 box centred on the block containing its location. As such it is subscribed to blocks C1:E3 as indicated by shading in FIG. 5a.

Figure 5B:
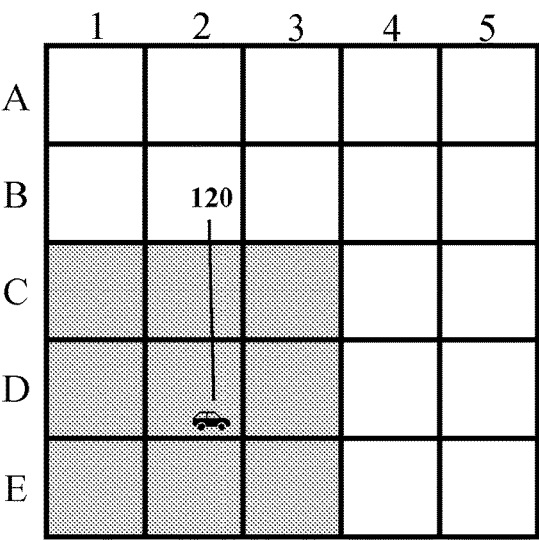

In FIG. 5b, the device 120 has moved towards D3 but has not left D2, as such, it remains subscribed to blocks C1:E3.

Figure 5C:
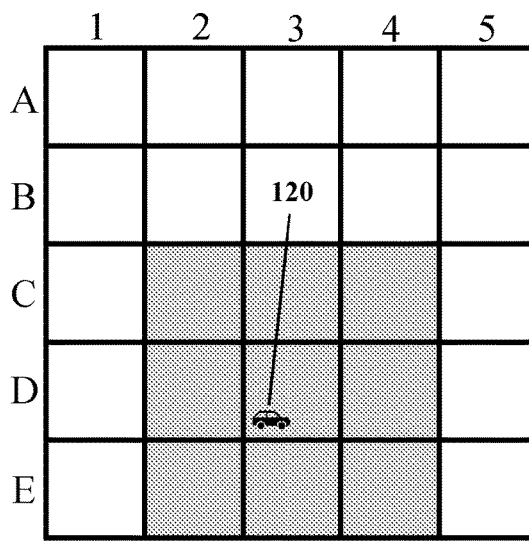

In FIG. 5c, the device 120 has now moved from D2 into D3. As such, the device 120 is now subscribed to blocks C2:E4, and would have also transmitted its location as being in block D3 as described above.

Figure 5D:
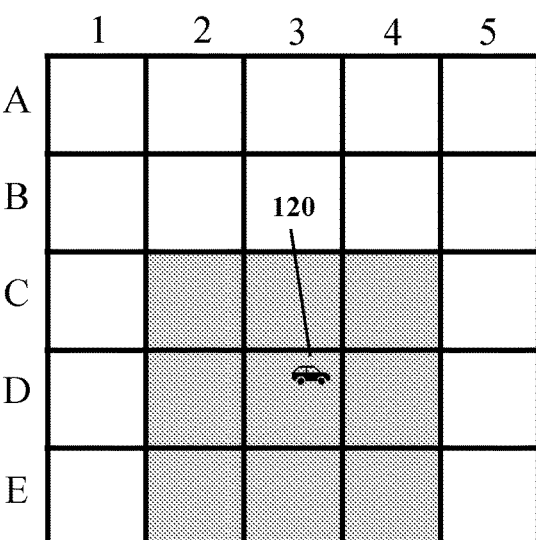

In FIG. 5d, the device 120 has moved to the corner of D3 adjacent C4 but has not left D3, as such it remains subscribed to blocks C2:E4.

Figure 5E:
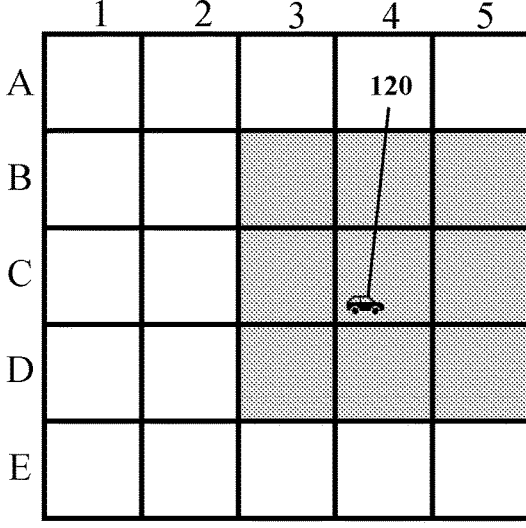

In FIG. 5e, the device 120 has moved into the corner of C4 adjacent D3. As it is now in C4, it is subscribed to B3:D5 and has transmitted its location as being in C4.

Figure 5F:
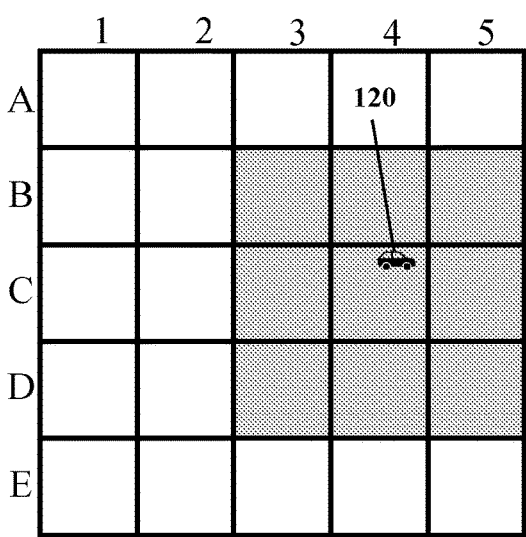

In FIG. 5f, the device 120 has moved within C4 to the corner adjacent B5. As it has not changed block, its subscription remains B3:D5.

Figure 5G:
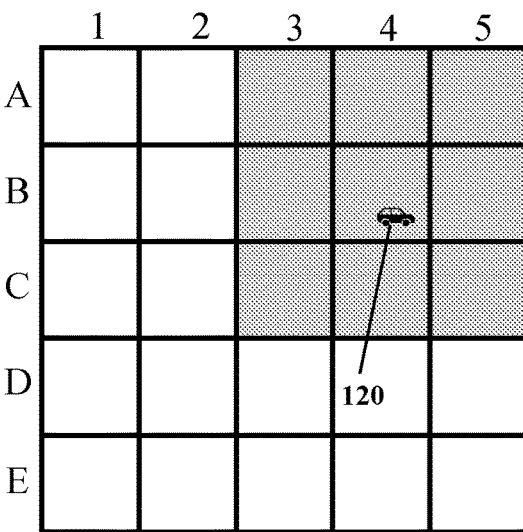

In FIG. 5g, the device 120 has moved into B4 from C4. As such, it is now subscribed to A3:C5 and transmits its location as B4.

Referring to FIGS. 6a and 6b, in this embodiment the blocks are defined in terms of a latitude and a longitude and the location module 121, 131 allocates the device 120, 130 to a block by determining the latitude and longitude of the device 120,130 and rounding the latitude/longitude to the nearest 0.001 degrees.

In FIG. 6a, the driver device 120 is in a block defined by a latitude/longitude of 53.406/−2.966 degrees, and the cyclist device 130 is in block 53.407/−2.965. These blocks are adjacent to one another and as such, both the cyclist and driver devices will receive publications on the basis of information transmitted by one another. As such, they are aware of each other's presence.

In FIG. 6a, the separation between the devices 120,130 is 148 metres. This is greater than 100 m and therefore no proximity notification is generated. However, in other embodiments speed and/or heading of the respective devices may also be considered in determining if a proximity notification is generated. So, for example, if the devices in adjacent blocks are approaching each other a notification may be generated irrespective of the distance between them.

In FIG. 6b, the devices 120, 130 remain in the same blocks as in FIG. 6a, but the separation between the devices is now 282 metres. The devices 120, 130 are still in adjacent blocks, and so receive publications in relation to each other, but as with FIG. 6a, no proximity notification is generated as they are still separated by a distance of over 100 m.

Referring to FIG. 7, the driver device 120 is in block 53.407/−2.965 and the cyclist device is in block 53.406/−2.966. In a similar way to FIGS. 6a and 6b, the driver subscribes to all blocks adjacent to 53.407/−2.965, including the cyclist's block. This is indicated by the shaded area on FIG. 7. As such, the driver device 120 receives publications from the device manager 110 in relation to information transmitted by the cyclist device 130.

Referring to FIG. 8, a second embodiment of the present disclosure is shown in which a proximity monitoring system 200 comprises a device manager 210 (not shown); a driver monitoring device 220; a first cyclist monitoring device 230; and a second cyclist monitoring device 240. This embodiment is similar to the previous embodiment except that an additional cyclist monitoring device 240 is present.

In this example, the driver device 220 is in block 53.406/−2.966; the first cyclist 230 is in block 53.406/−2.965; and, the second cyclist 240 is in block 53.406/−2.967. As such, the cyclists are in blocks adjacent to the driver and the driver receives publications from both cyclists.

The distance between the driver 220 and first cyclist 230 is 200 metres, as such a proximity notification is not generated. However, the distance between the driver 220 and second cyclist 240 is 100 metres. As such, a proximity notification is generated and displayed to the driver alerting them of the second cyclist 240.

In other embodiments, the driver device's speed may also be considered. Where the driver device 220 and first cyclist 230 are predicted to encounter each other, a proximity notification may be displayed to the driver of the automobile incorporating the driver device 220.

Referring to FIG. 9, the second embodiment of the present disclosure is also configured to allow devices 220, 230, 240 in the system 100 to request assistance from other devices 220, 230, 240. In this embodiment, the user interface 224, 234, 244 is further configured to generate an assistance request in response to input from the user of the device 220, 230, 240, and the communication module 222, 232, 242 is further configured to establish two-way communication with another device 220, 230, 240. In addition, the device manager is configured to: (optionally) store an assistance subscription for each device that includes details of one or more blocks the device is subscribed to for the purpose of receiving assistance requests. In this embodiment, device 220, 230, 240 is subscribed to a larger number of blocks for the purpose of receiving assistance requests than for the purpose of receiving publications in relation to the presence of other devices. In other embodiments, a user may manually define the assistance subscription blocks, for example a repair shop may define an area within a certain distance of the shop.

In this example, see FIG. 9, the second cyclist device 240 has an assistance subscription to the block containing the first cyclist device 230, and the first cyclist device 230 requests assistance.

At step S91, the user interface 234 receives an input from a user of the device 230 requesting assistance. In response the user interface 234 is generates an assistance request. In this embodiment, the assistance request comprises the user's location, the device 230 unique identifier, and a free text field for the user to describe the nature of the request. In other embodiments, a range of suitable information could be included such as photos etc.

At step S92, the communication module 232 transmits information containing the assistance request, the device's unique identifier and the block the first cyclist device 230 is located within to the device manager 110. As above, the device manager 110 transmits this information in the form of publications to each device which has an assistance subscription to the block containing the first cyclist device's location, such as the second cyclist device 240.

At step S93, the communication module 242 of the second cyclist device 240 is receives a publication from the device manager 110 as it has an assistance subscription to the block containing the first cyclist device 230.

At step S94, the user interface 244 of the second device 240 notifies the user of the device 240 of the received assistance request.

At step S95, the user interface 244 is receives confirmation of the request by the user of the device 240, and in response the communications module 242 establishes two-way communication with the requesting device, the first cyclist device 230, on the basis of the information contained in the publication.

As described above, the users can easily arrange remote assistance with each other when they are nearby and able to help. Embodiments of the present disclosure also allow for recognised assistance providers to receive and respond to assistance requests as described above. The assistance provider may subscribe to specific blocks for the purpose of receiving assistance requests. As such, the device manager 110 will only transmit a publication to the assistance provider if it contains an assistance request and relates to a block the assistance provider is subscribed to. This allows for each device in the system to both monitor for nearby devices that might be a collision risk and separately monitor for devices that need assistance in a larger area.

The present disclosure provides a quick and efficient proximity monitoring system using a subscription model that allows individual devices to receive information relating to nearby devices. This removes the need to calculate absolute distances between each device to determine if they are nearby and allows for each device to generate proximity notifications locally.

The one or more embodiments are described above by way of example only. Many variations are possible without departing from the scope of protection afforded by the appended claims.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology as exemplified by the appended claims.

What is claimed is:

1. A method of monitoring the proximity of two or more monitoring devices comprising the steps of:
   defining a series of subspaces within a space containing the two or more monitoring devices;
   determining a subspace of the series of subspaces containing a location of a device of the two or more monitoring devices;
   subscribing each device of the two or more monitoring devices to one or more subspaces of the series of subspaces; and
   publishing the presence of the device to other devices of the two or more monitoring devices that are subscribed to the subspace containing the location of the device,
wherein the series of subspaces are defined by a grid, the method further comprising the steps of: determining if any of the two or more monitoring devices move into a different subspace of the series of subspaces; and changing the subspaces to which a moved device is subscribed in response to movement of the moved device into the different subspace.

2. A method as claimed in claim 1 wherein the grid is substantially uniform.

3. A method as claimed in claim 1 including the step of publishing the presence of a respective device of the two or more monitoring devices in a respective subspace of the series of subspaces in response to movement of the respective device into the respective subspace.

4. A method as claimed in claim 1 including the step of detecting when a respective device of the two or more monitoring devices has moved a threshold distance.

5. A method as claimed in claim 4 including the step of publishing the presence of a respective device of the two or more monitoring devices in a respective subspace of the series of subspaces in response to detection of the device moving a threshold distance.

6. A method as claimed in claim 1 wherein a respective device of the two or more monitoring devices is subscribed to at least a 3×3 array of subspaces of the series of subspaces centred on a subspace of the series of subspaces containing a location of the respective device.

7. A method as claimed in claim 1 including the step of generating a proximity notification in response to the publication of the presence of a respective device of the two or more monitoring devices in a respective subspace of the series of subspaces.

8. A method as claimed in claim 1 including the steps of: generating a request for assistance in relation to a respective device of the two or more monitoring devices; and, publishing the request for assistance to other devices that are subscribed to a respective subspace of the series of subspaces containing the location of the respective device.

9. A method as claimed in claim 1 including the step of notifying a user of a respective device of the two or more monitoring devices in response to receipt of a publication by the respective device.

10. A method as claimed in claim 1 including the step of establishing two-way communication between two devices of the two or more monitoring devices in response to receipt of a publication by either of the two devices.

11. A system for proximity monitoring, the system comprising two or more monitoring devices and a device manager in communication with each monitoring device, each monitoring device comprising:

a location module configured to define a series of subspaces in a space containing the two or more monitoring devices, and determine a subspace of the series of subspaces containing a location of a device of the two or more monitoring devices; and, a communication module configured to transmit details of the subspace containing the location of the device to the device manager and to receive information from the device manager;

wherein the device manager is arranged to:

receive information from the device;

store a subscription of each device of the two or more monitoring devices to one or more subspaces of the series of subspaces; and, publish the presence of the device to other devices of the two or more monitoring devices that are subscribed to the subspace containing the location of the device, wherein the series of subspaces are defined by a grid, wherein each device further comprises a proximity module configured to generate a proximity notification in response to receipt of a publication by the device manager and wherein: the location module is configured to determine the location of the device; the communication module is configured to transmit details of the location of the device to the device manager; the device manager is configured to include details of the location of the device in publications to other devices; and, the proximity module is configured to generate a proximity notification if a distance between a location of one of the other devices and the location of the device is less than a threshold distance.

12. A system as claimed in claim 11 wherein the location module is further configured to determine one or more subspaces to which the device is subscribed; the communication module is configured to transmit details of the subscribed subspaces to the device manager; and the device manager is configured to update the subscribed subspaces of the device in response to received information from the device.

13. A system as claimed in claim 11 wherein the proximity module is configured to store a record of proximity notifications.

14. A system as claimed in claim 13 wherein the proximity module is further configured to consider the record of proximity notifications when generating a proximity notification.

15. A system as claimed in claim 14 wherein the proximity module generates a proximity notification if the record of proximity notifications indicates a threshold time has passed since a previous proximity notification.

16. A system as claimed in claim 11 wherein each device further comprises a user interface configured to generate an assistance request, the communication module is configured to transmit details of an assistance request to the device manager, and the device manager is configured to transmit an assistance request from a respective device of the two or more monitoring devices as a publication to other devices of the two or more monitoring devices if the other devices are subscribed to a subspace of the series of subspaces containing a location of the respective device.

17. A system as claimed in claim 16 wherein the device manager is configured to: store an assistance subscription of each device to one or more subspaces of the series of subspaces for the purpose of receiving assistance requests; and, publish assistance requests made by the respective device in a subspace to other devices subscribed to that subspace for the purpose of receiving assistance requests, wherein for at least one of the two or more monitoring devices the assistance subscription is different to the subscription for the purpose of receiving publications relating to the presence of other devices.

18. A method of monitoring the proximity of two or more monitoring devices comprising the steps of:

defining a series of subspaces within a space containing the two or more monitoring devices;

determining a subspace of the series of subspaces containing a location of a device of the two or more monitoring devices;

subscribing each device of the two or more monitoring devices to one or more subspaces of the series of subspaces; and publishing the presence of the device to other devices of the two or more monitoring devices that are subscribed to the subspace containing the location of the device, wherein the series of subspaces are defined by a grid and wherein the method includes the steps of: detecting when the devices has moved a threshold distance and publishing the presence of the device in a subspace of the series of subspaces in response to detection of the device moving a threshold distance.

19. The method of claim 18 wherein a respective device is subscribed to at least a 3×3 array of subspaces of the series of subspaces centred on the subspace containing a location of the respective device.

20. The method of claim 18 including the steps of: generating a request for assistance in relation to a respective device; and, publishing the request for assistance to other devices of the two or more monitoring devices if the other devices are subscribed to the subspace containing a location of the respective device.

* * * * *